United States Patent [19]
Kaminski

[11] Patent Number: 5,621,960
[45] Date of Patent: Apr. 22, 1997

[54] METHOD AND APPARATUS FOR FORMING AN ASSEMBLY OF A FLEXIBLE TUBE AND CLOSURE

[75] Inventor: Ronald S. Kaminski, Bowling Green, Ohio

[73] Assignee: Owens-Illinois Plastic Products Inc., Toledo, Ohio

[21] Appl. No.: 356,936

[22] Filed: Dec. 15, 1994

Related U.S. Application Data

[63] Continuation-in-part of Ser. No. 228,055, Apr. 15, 1994, abandoned.

[51] Int. Cl.$^6$ .............. B23P 11/00; B23P 19/00
[52] U.S. Cl. .............. 29/456; 29/35.5; 29/564.1; 29/773; 29/785; 29/792; 53/331.2; 53/490; 53/561
[58] Field of Search .............. 29/33 D, 33 T, 29/35.5, 564.1, 240, 456, 801, 773, 785, 792; 83/54, 456; 81/3.07, 3.09, 3.2, 3.36, 3.4; 53/331.5, 452, 490, 558–561; 264/159; 425/301

[56] References Cited

U.S. PATENT DOCUMENTS

| | | |
|---|---|---|
| 2,503,171 | 4/1950 | Posner .................................. 264/159 |
| 2,710,987 | 6/1955 | Sherman . |
| 2,908,034 | 10/1959 | Hackett . |
| 2,911,673 | 11/1959 | Soubier . |
| 3,032,810 | 5/1962 | Soubier . |
| 3,115,682 | 12/1963 | Soubier et al. . |
| 3,144,493 | 8/1964 | Santelli . |
| 3,906,070 | 9/1975 | Lajovic ................................ 264/159 |
| 3,924,502 | 12/1975 | Borzym ................................ 83/54 X |
| 3,950,801 | 4/1976 | Morrison ............................. 81/3.2 X |
| 4,118,452 | 10/1978 | Myers et al. . |
| 4,152,566 | 5/1979 | Magerle ............................... 29/564.1 |
| 4,188,179 | 2/1980 | Linss et al. . |
| 4,305,902 | 12/1981 | Uhlig . |
| 4,806,091 | 2/1989 | Linss et al. . |
| 4,806,092 | 2/1989 | Linss et al. . |
| 4,806,093 | 2/1989 | Linss et al. . |
| 4,808,105 | 2/1989 | Linss et al. . |
| 5,271,296 | 12/1993 | Parent et al. ............................. 81/3.2 |
| 5,370,019 | 12/1994 | Sartell et al. ......................... 81/3.2 X |

FOREIGN PATENT DOCUMENTS

| | | | |
|---|---|---|---|
| 135017 | 5/1960 | U.S.S.R. ............................. | 53/331.5 |
| 1180837 | 2/1970 | United Kingdom ................. | 53/331.5 |

*Primary Examiner*—S. Thomas Hughes

[57] ABSTRACT

A method and apparatus which provides for holding a closure that has threads stationary and rotating the container about its longitudinal axis to apply the closure on the container. Preferably the closure and container are in inverted position. The method of cutting provides for holding the container and closure in inverted positioned, gripping the container and moving a knife transversely of the longitudinal axis of the container to sever the bottom from the container.

63 Claims, 15 Drawing Sheets

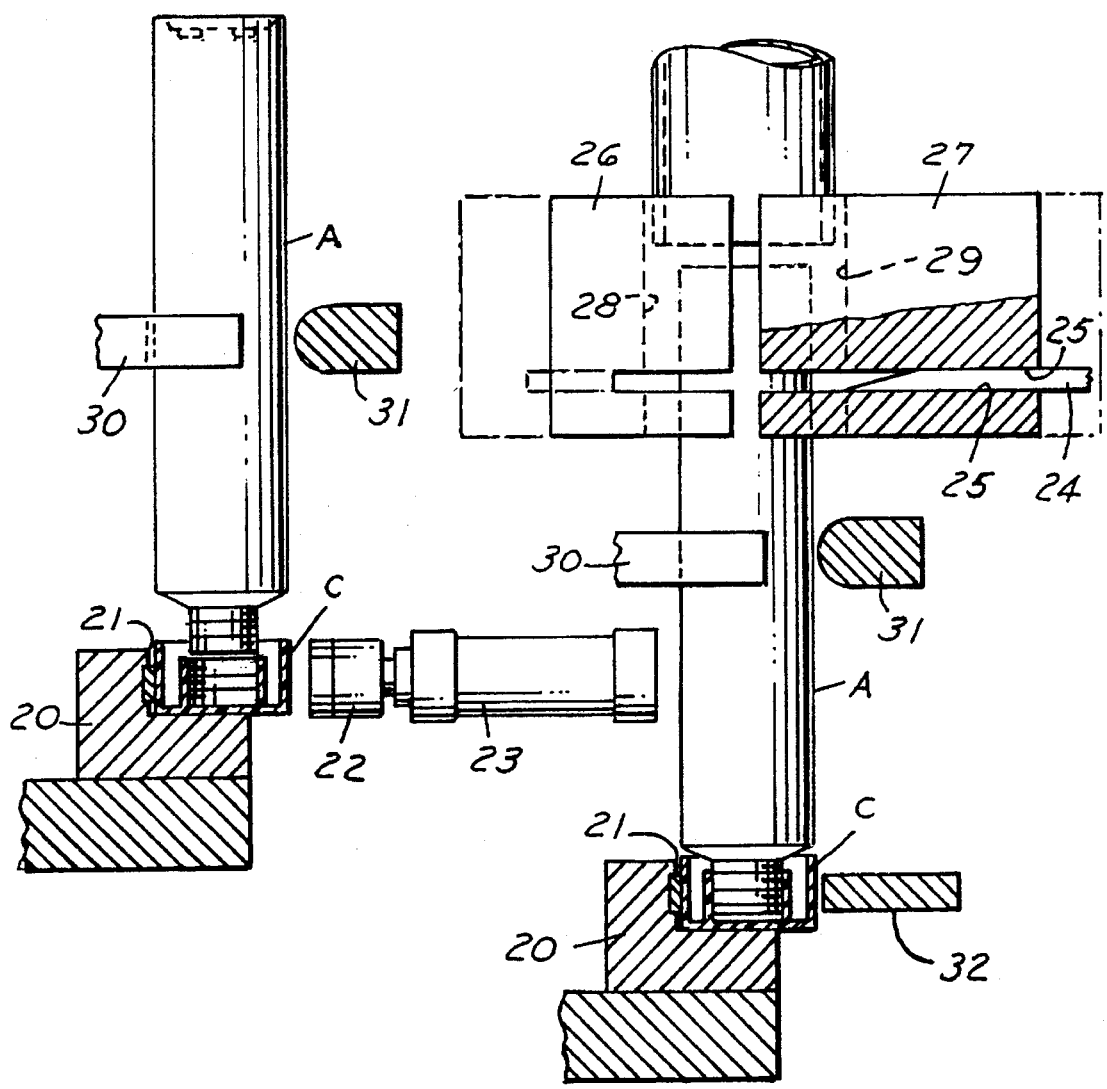

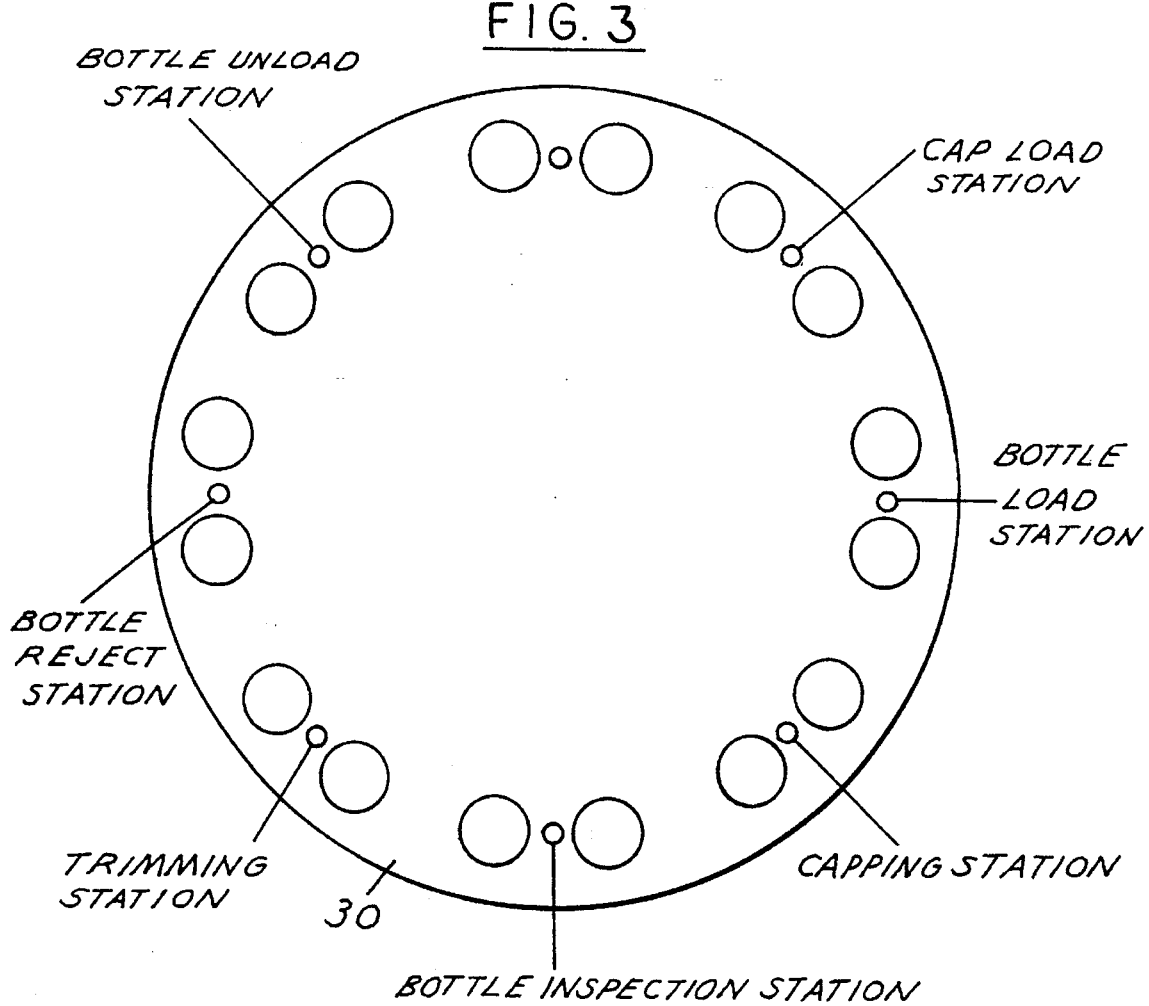

5,621,960

METHOD AND APPARATUS FOR FORMING AN ASSEMBLY OF A FLEXIBLE TUBE AND CLOSURE

This application is a continuation-in-part of application Ser. No. 08/228,055 filed Apr. 15, 1994, now abandoned.

This invention relates to the manufacture of flexible tubes utilized for containing and dispensing viscous products such as personal care products and the like.

BACKGROUND AND SUMMARY OF THE INVENTION

In one method of manufacture of such flexible tubes, a fitment defining a threaded neck is attached to an open-ended tube and then the product is filled through the other end of the tube and the other end is closed.

In another method of making such flexible tubes, a hollow container having an integral neck is formed, as by blow molding, the base of the container is severed from the container, the container is placed on a mandrel whereupon decoration is applied to the open-ended container, a closure is applied to the finish and then the ultimate user fills the container through the open end and seals the open end.

In copending application Ser. No. 08/228,048 filed Apr. 15, 1994, there is disclosed and claimed a flexible plastic tube and a method for forming a tube wherein the method of forming a flexible plastic tube for use in dispensing a viscous product comprises injection molding a finish having an opening, extruding a tube integrally with the finish by relevant movement of the finish with respect to an extruder, moving the finish axially away from the extruder while continuing continuously extruding said tube, closing a blow mold about the extruded tube, blowing said tube into an integral container body having a closed bottom, opening the molds to provide an integral container having an integral finish, a shoulder portion, a tubular body portion and a closed bottom, decorating the body portion with indicia, cutting the closed bottom of the container leaving an article having a finish, a shoulder portion and an open end tube. A closure is applied after the decorating step. Thereafter a user may fill the tube through the open end and seal the open end.

In copending application Ser. No. 08/228,055 filed Apr. 15, 1994, of which the present application is a continuation in part, there is disclosed a method and apparatus for applying the closure and for cutting the bottom from the container after the container has been subjected to one or more decorating operations. The method and apparatus provides for holding a closure which has threads stationary and rotating the container about its longitudinal axis to apply the closure on the container. Preferably the closure and container are in inverted position. The method of cutting provides for holding the container and closure in inverted positioned, gripping the container and moving a knife transversely of the longitudinal axis of the container to sever the bottom from the container.

Among the objectives of the present invention are to provide a method and apparatus for performing the method of the aforementioned application in the improved manner; wherein the containers are handled in multiples; and wherein uniformity of application of the closures and cutting of the containers can be achieved at high speeds.

In accordance with the invention there are provided a method and apparatus wherein a turret station is moved intermittently past a capping station and trimming station; wherein containers in multiples are carried by the turret past each of the stations; and wherein the capping and trimming assemblies are constructed and arranged to function to cap each container at a predetermined torque and cut each container uniformly and accurately.

DESCRIPTION OF THE DRAWINGS

FIG. 1 is a part sectional elevational view of an apparatus for holding a closure and applying the closure to a container.

FIG. 2 is a part sectional elevational view of an apparatus for holding the closure of an assembled closure and container and severing the bottom of the container.

FIG. 3 is a diagrammatic view of a preferred form of apparatus for performing the application of the closure and severing the bottom.

DESCRIPTION OF THE PREFERRED EMBODIMENT

Figure 4:
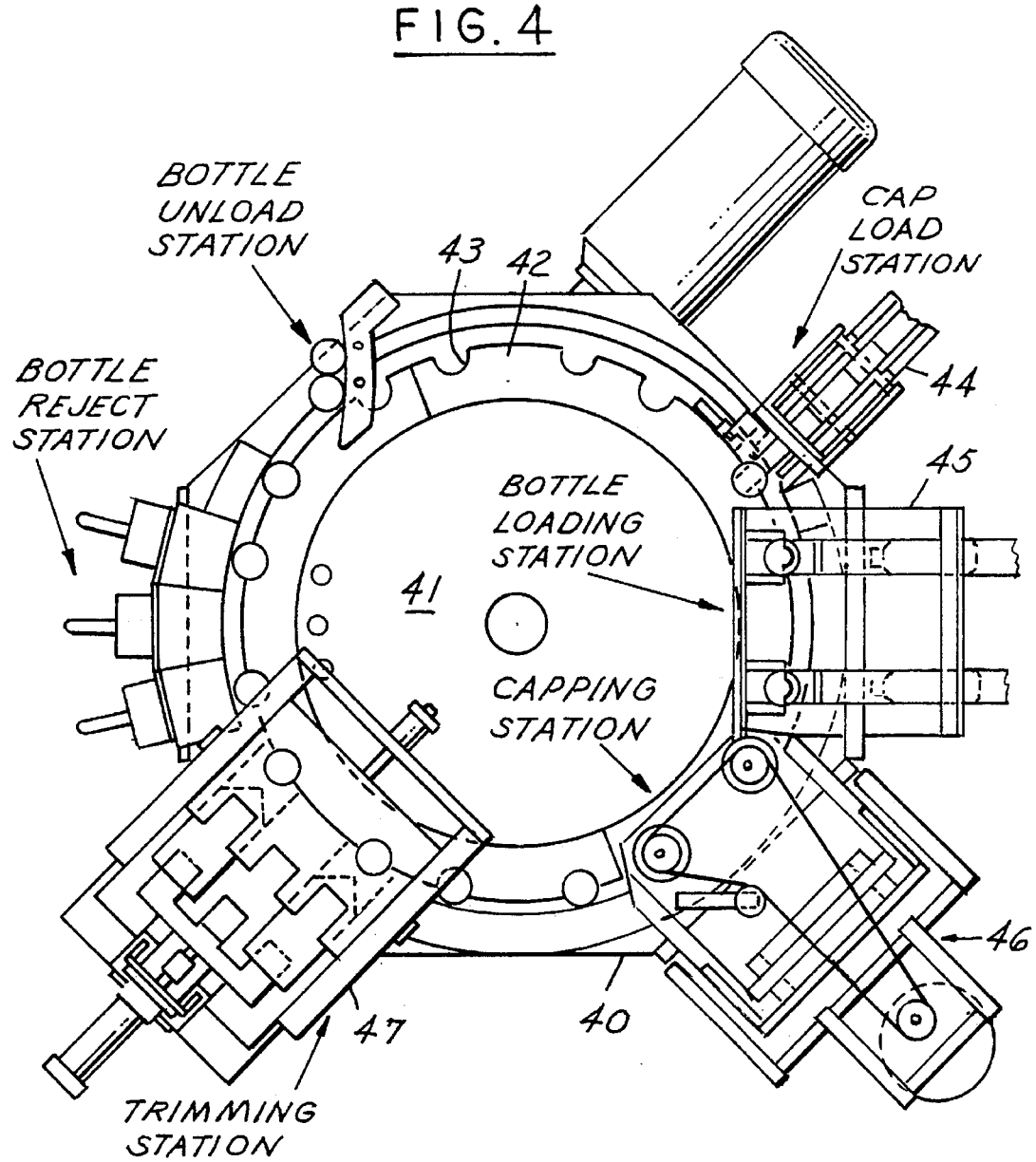
FIG. 4 is a plan view of an apparatus embodying the invention station.

Referring to FIGS. 1–3, the apparatus for applying a closure C to a container A consists of a base 20 preferably in the form of a turret having a lower star wheel with recesses 21 for receiving closures C. Each closure C is held in position for threading on a container A by a clamp 22 actuated by a cylinder 23. The apparatus further includes a chuck 15 having lugs 16, 17 thereon for engaging recesses in the inverted base of the container A and rotating the container. The chuck 15 is spring loaded by a spring 18 and driven by a shaft 19. The shaft 19 is movable toward and away from the base of the container A by a suitable mechanism such as a cam or a cylinder. An upper star wheel 30 having recesses and an associated guide rail 31 holding for the body of the inverted container A.

Referring to FIG. 2, the apparatus for severing the bottom of a container comprises a lower star wheel 20 having recesses 21 for receiving the closures C on the inverted containers A and an associated guide rail 32. The apparatus also includes an upper star wheel 30 with recesses for the container body 34 and an associated guide rail 31. The upper end of the container is clamped by blocks 26, 27 having recesses 28, 29 which are movable relative to one another to hold the upper end of the container A. A guillotine blade 24 is movable across the bottom of the closure by a cylinder to sever the bottom of the container A along a plane that is at 90° to the vertical or longitudinal axis of the container A. The guillotine 24 is guided by guide surfaces 25 in the blocks 26, 27.

Referring to FIG. 3, the apparatus of FIG. 1 is preferably positioned at a capping station adjacent a rotary turret 30 which is driven intermittently past the capping station to apply the container to the closure. The apparatus shown in FIG. 2 is located at a trimming station and the turret 30 moves the inverted containers past the trimming station to sever the bottom of the container. A guide rail 32 retains the lower end of the capped container in recesses the lower star wheel during severing of the bottom of the container.

Figure 18:
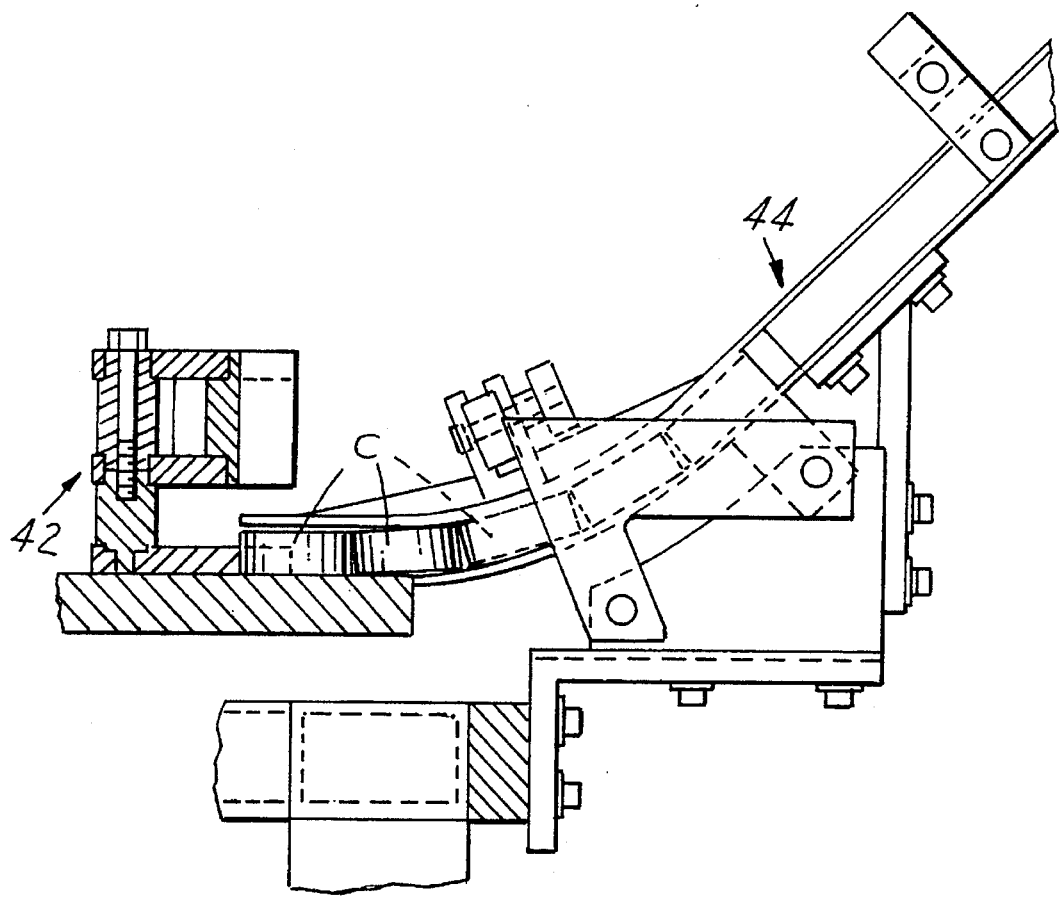
FIG. 18 is a part sectional view of the closure feed apparatus at another station.

Referring to FIG. 4 a preferred form of apparatus for performing the method consists of a base 40 on which a turret 41 is rotatably mounted and driven intermittently. Turret 41 supports a star wheel 42 having a bottle or container receiving cavities 43. The apparatus as shown is intended to handle two caps and two containers at a time and includes a cap loading apparatus 44 at a cap loading station which delivers caps or closures to the base of the turret singularly; a bottle loading apparatus 45 at a bottle loading station which delivers two bottles at a time down an inclined path and in inverted position to the cavities 43 of the star wheel (FIG. 18); a capping apparatus 46 at a capping station; and a trimming apparatus 47 at a trimming station. The apparatus further includes a bottle reject station and a bottle unload station.

Figure 5:
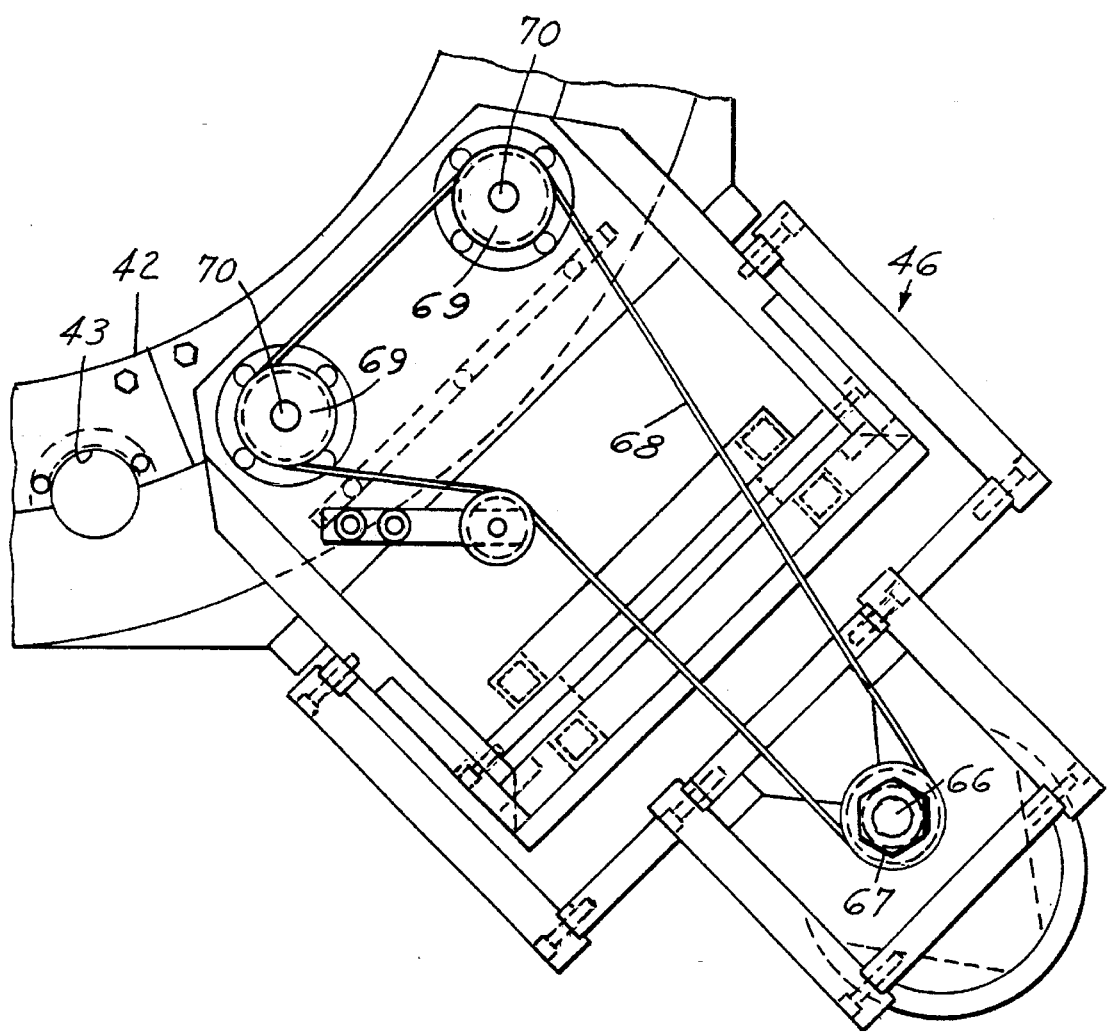
FIG. 5 is a plan view of the capping apparatus at the capping station shown in FIG. 4.
Figure 6:
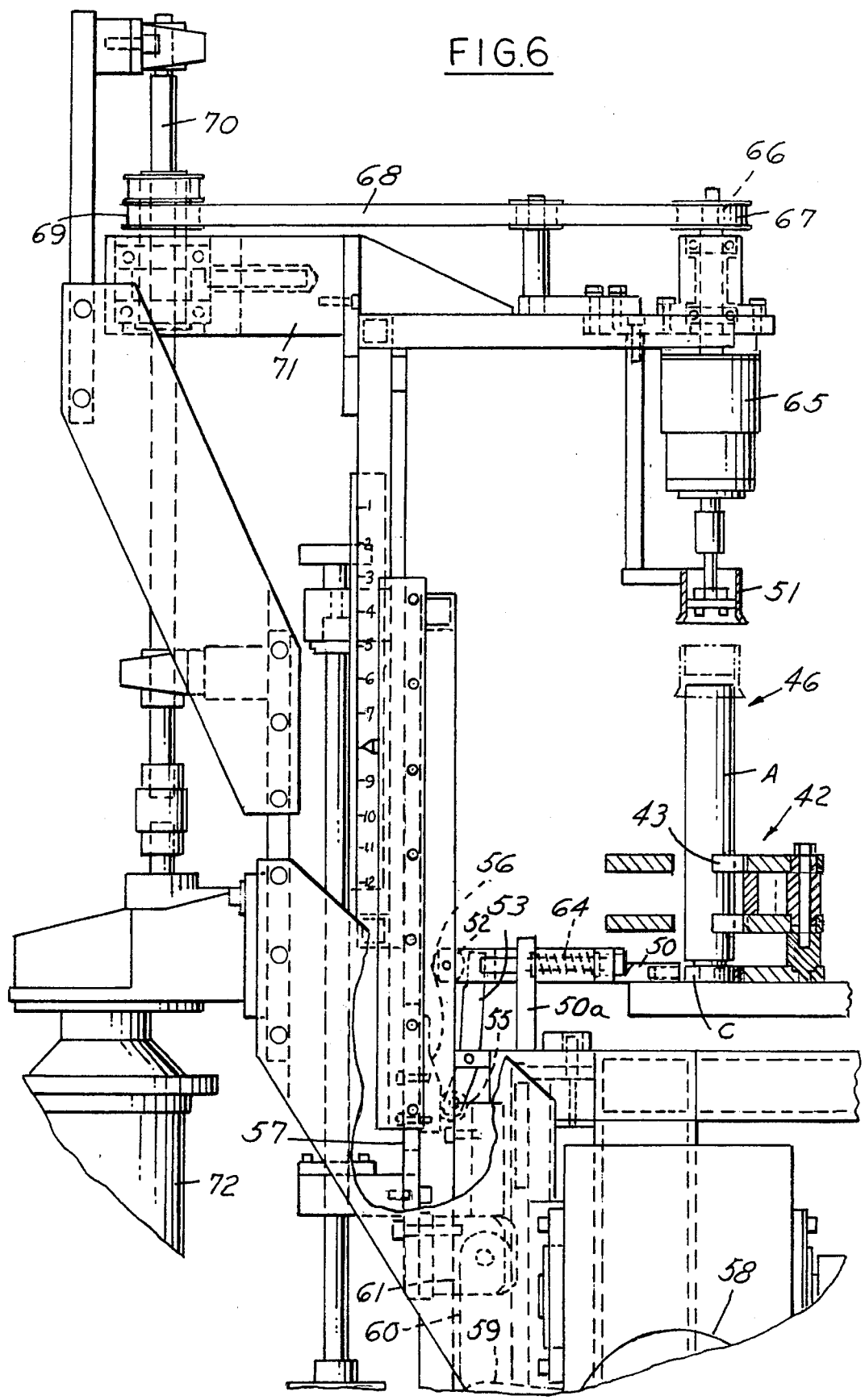
FIG. 6 is a fragmentary elevational view of the apparatus shown in FIG. 5.
Figure 7:
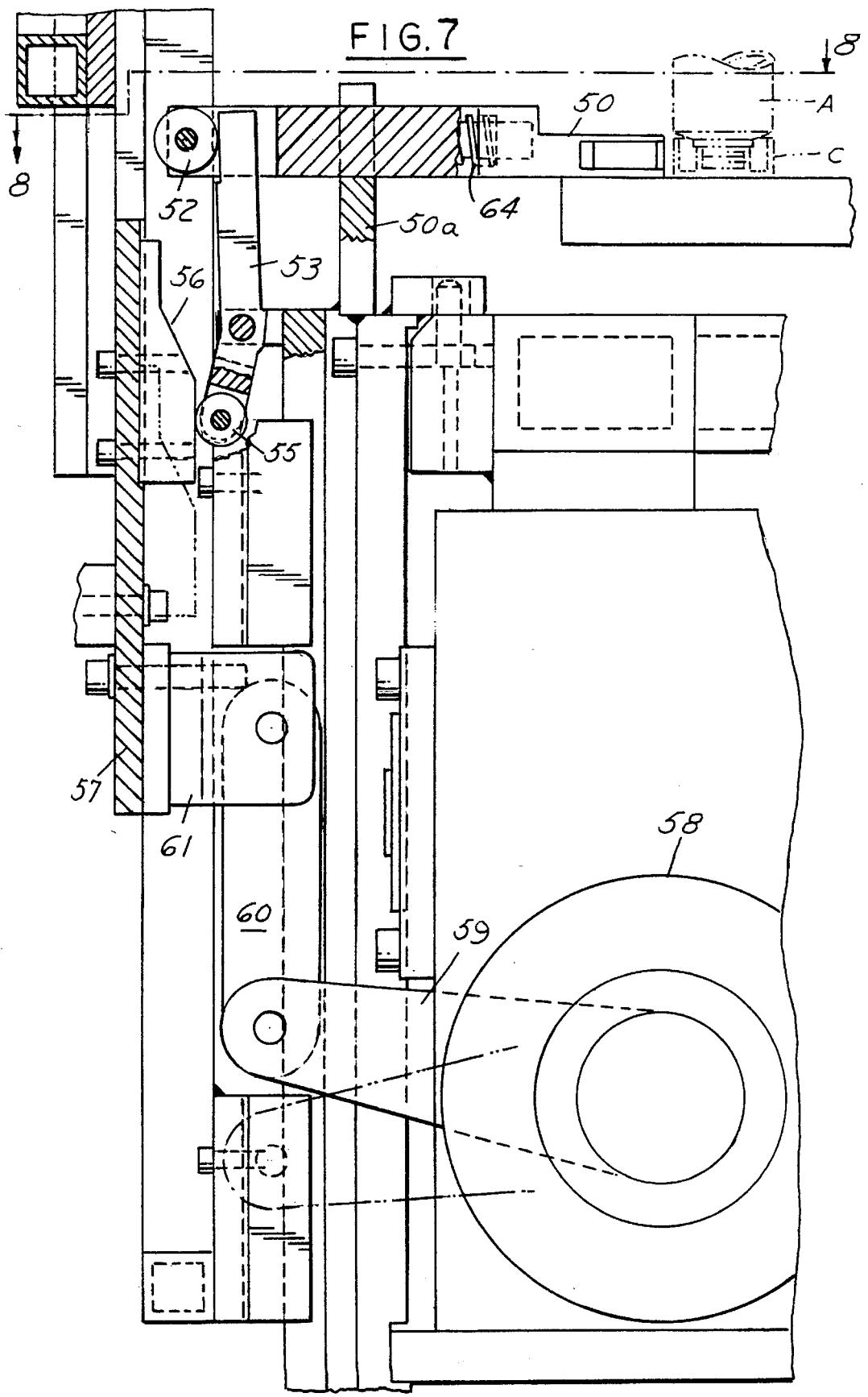
FIG. 7 is a part sectional elevational view of a portion of the apparatus shown in FIG. 6.
Figure 8:
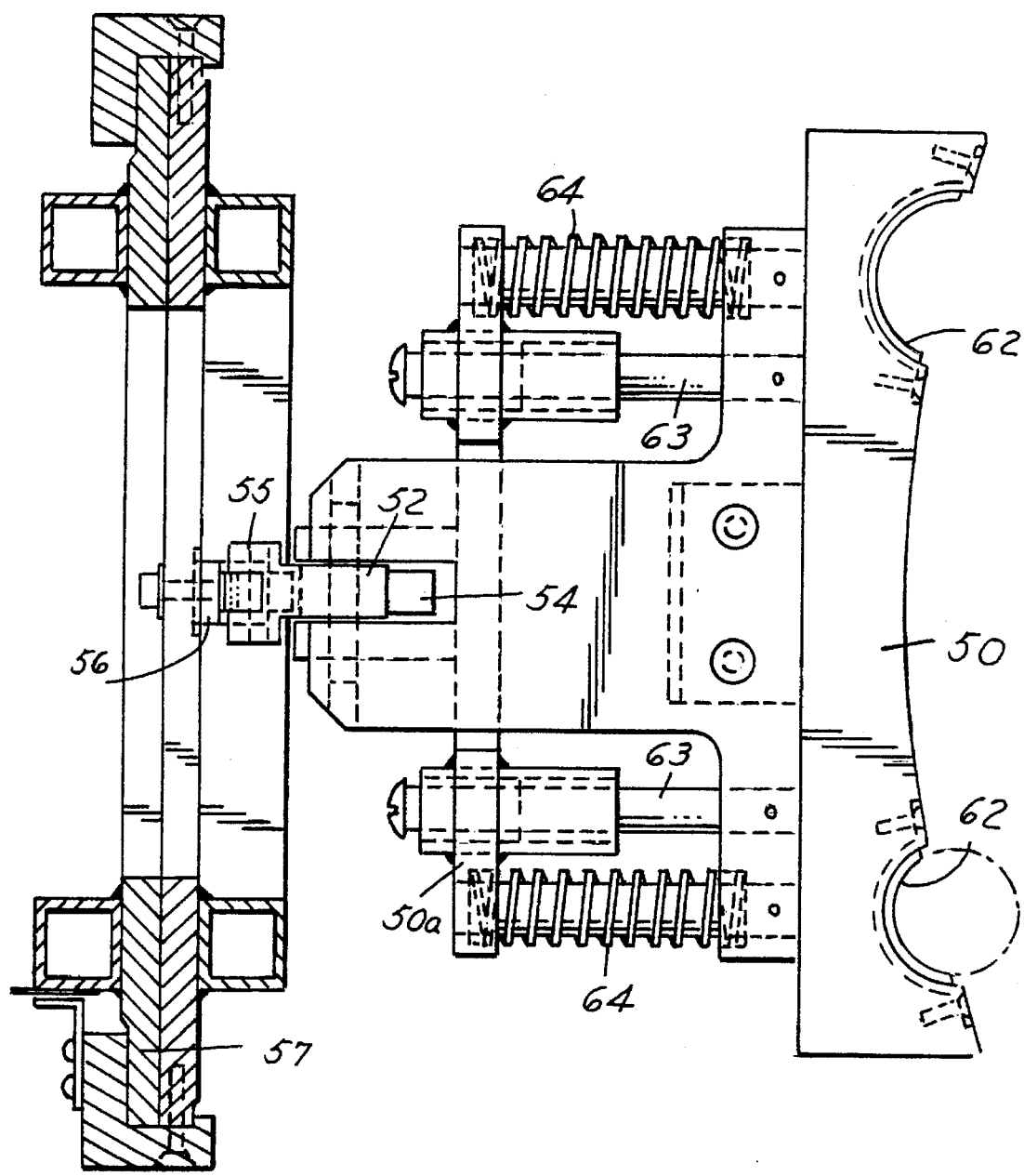
FIG. 8 is a fragmentary sectional view taken along the line 8—8 in FIG. 7.
Figure 9:
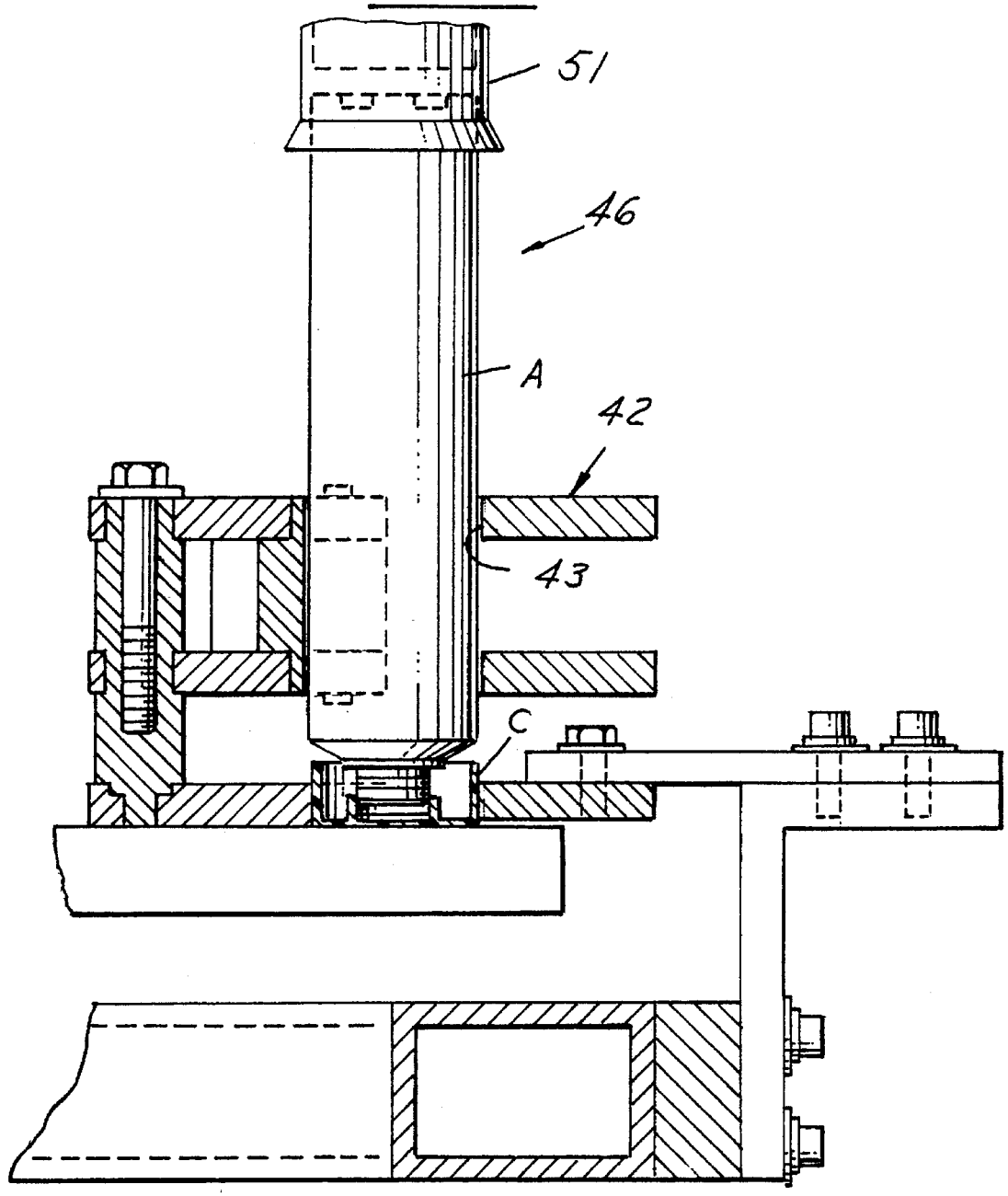
FIG. 9 is a fragmentary elevational view on an enlarged scale of another portion of the apparatus shown in FIG. 6.

Referring to FIGS. 5–9, the capping apparatus 46 includes a cap holding member 50 and is adapted to hold the two closures C stationary while the bottles A resting thereon are rotated by rotating chucks 51. The cap holding member 50 is moved radially toward and away from the closures C by engagement of a cam follower roller 52 with a lever 53 that has one end 54 engaging the roller 52 and a lower end 55 engaging a cam 56 (FIGS. 7, 8). An oscillating mechanism moves the cam 56 upwardly and downwardly through a support plate 57. The upward and downward movement is controlled by an oscillating motor 58 having a crank arm 59 thereon engaging a link 60 pivoted to a bracket 61 on fixed plate 57.

Referring to FIG. 8, the cap holding member 50 includes two recesses 62 for engaging simultaneously two caps C. The cap holding member 50 has shafts 63 fixed thereto which are slidably mounted in bearings in a fixed plate 50a. Springs 64 are interposed between the cap holding member 50 and plate 50a to yieldingly urge the cap holding member 50 radially toward the closures C as the cam follower 55 follows the cam 56. Referring to FIGS. 4–6, each chuck 51 is adapted to be rotated through a torque limiter 65 interposed between the chuck 51 and a shaft 66. A pulley 67 on shaft 66 has a belt 68 trained over a pulley 69 on a spline shaft 70. The shafts 66, 70 are rotatably mounted in a support 71 and moved vertically toward and away from the bottom of the containers by a linear motor 72. As shown in FIG. 4 which is a top plan view, each chuck 51 is driven in this manner.

As shown in FIGS. 6 and 7, the chuck 51 and associated apparatus are mounted on the support plate 57 such that it is moved along the spline shaft by the crank arm 90. In operation, the chuck is continuously rotating, the holding member is moved to hold the closures and then the chucks are lowered to engage the closures.

Figure 10:
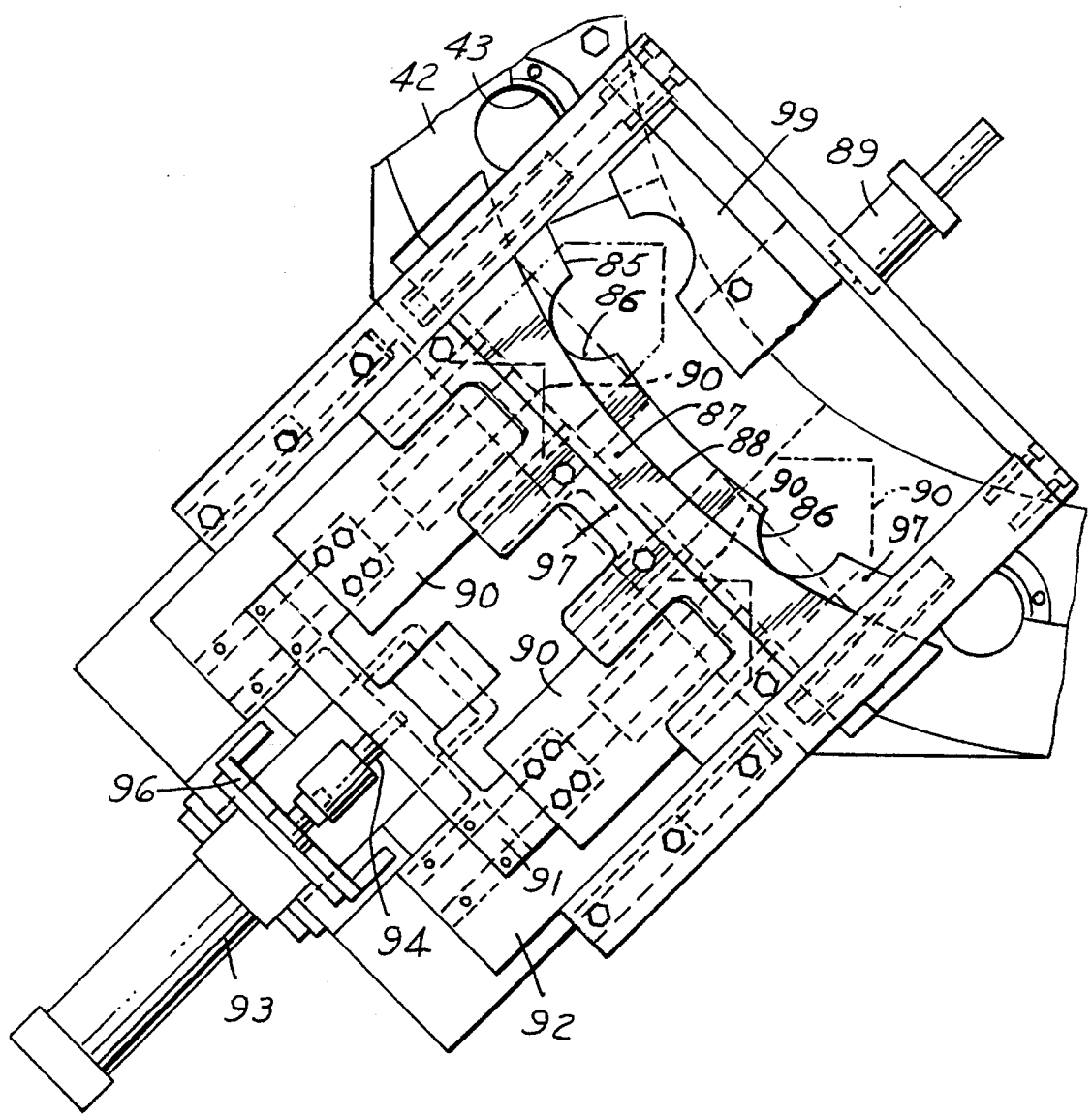
FIG. 10 is a fragmentary plan view of a trimming apparatus at a trimming station.
Figure 11:
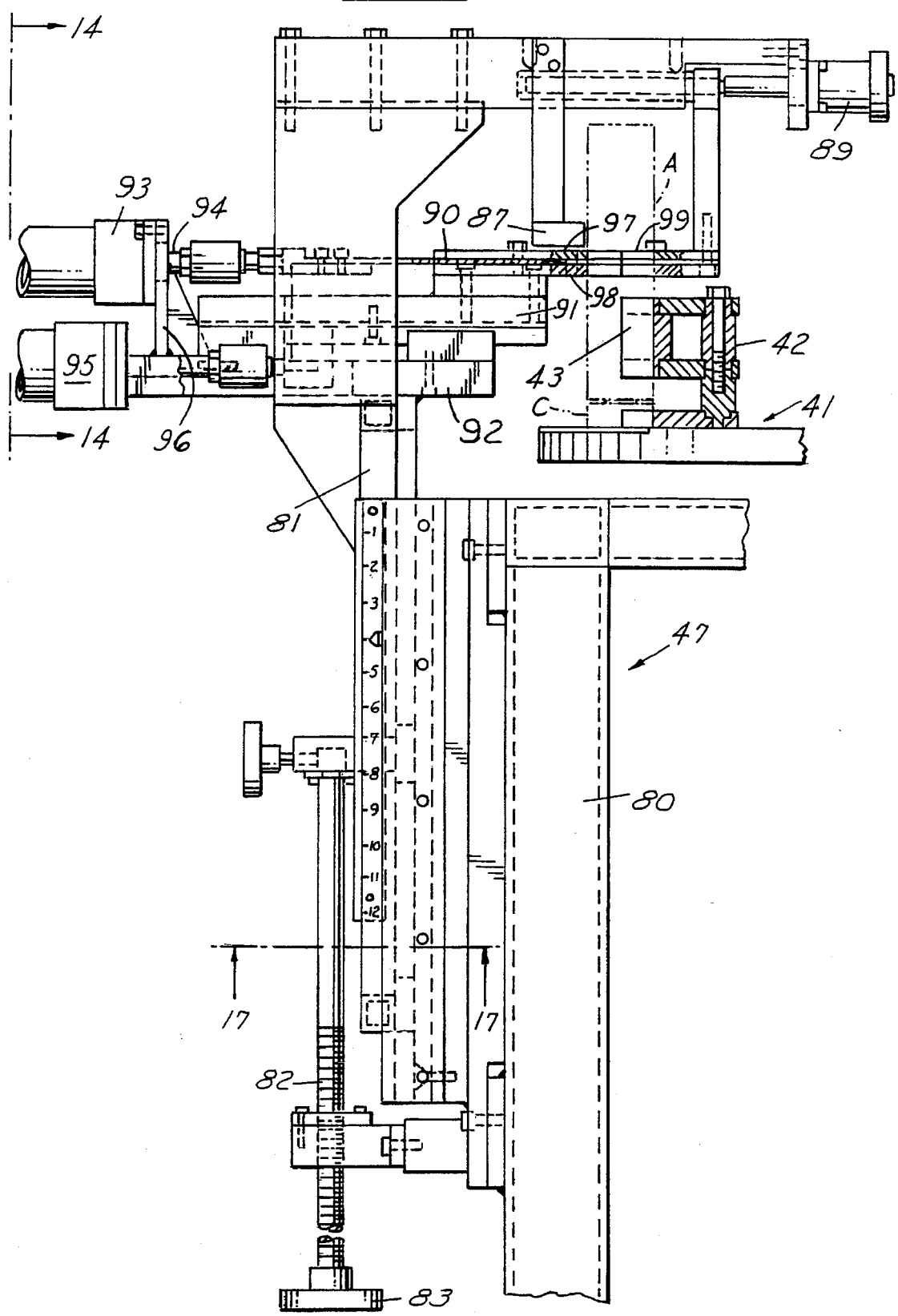
FIG. 11 is fragmentary part sectional elevational view of the apparatus shown in FIG. 10.
Figure 12:
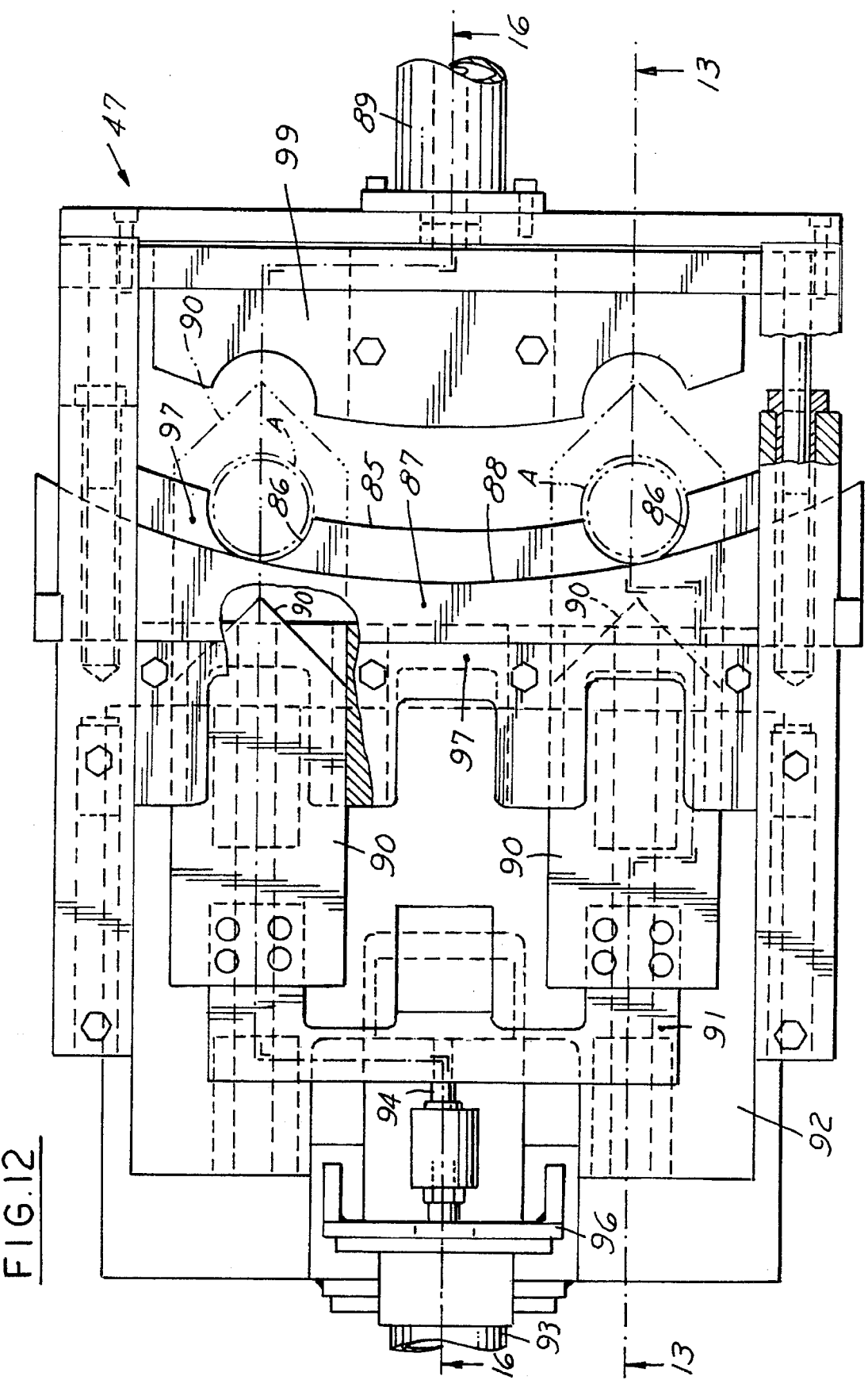
FIG. 12 is a fragmentary part sectional plan view on an enlarged scale of a portion of the apparatus shown in FIG. 10.
Figure 13:
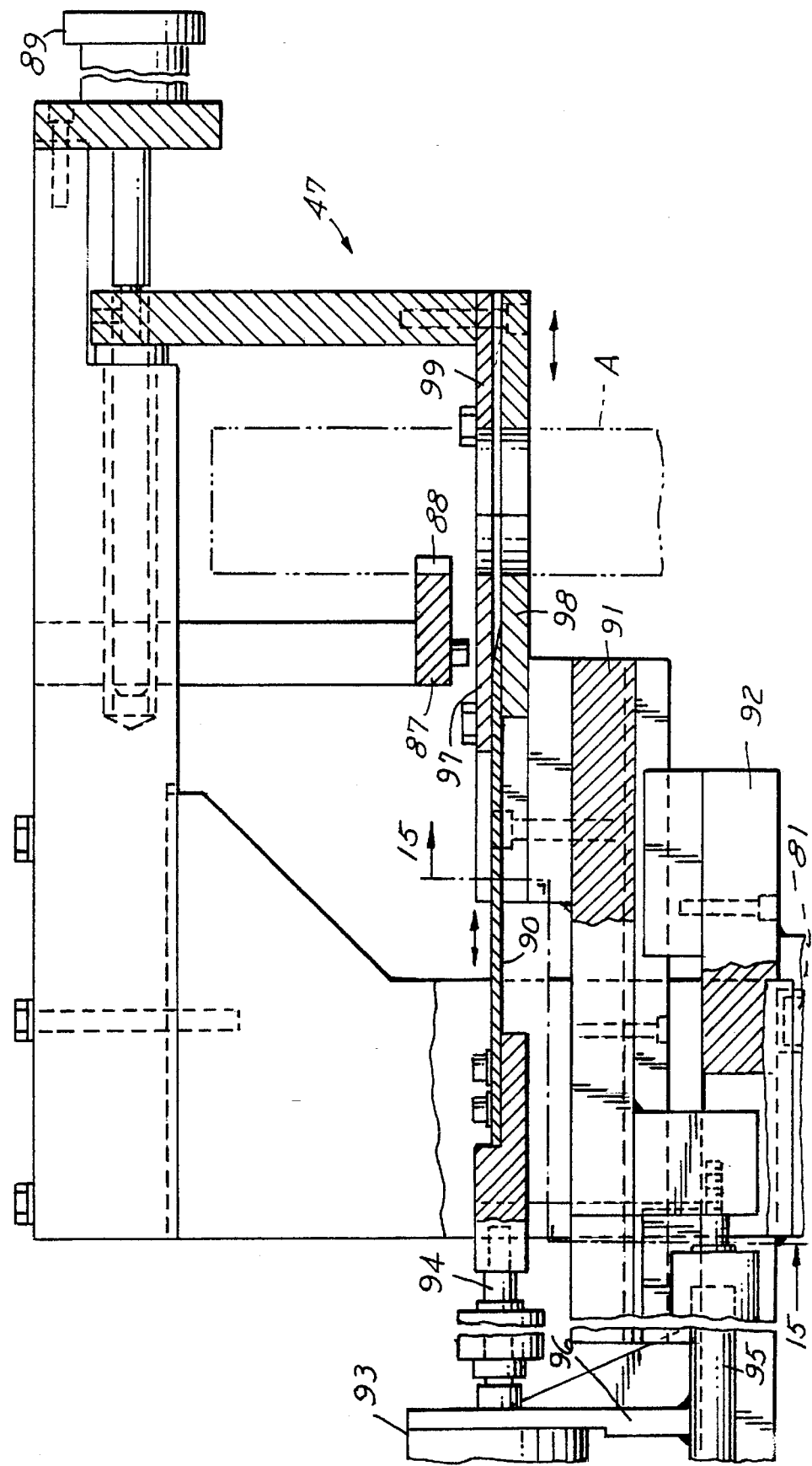
FIG. 13 is a fragmentary part sectional view taken along the line 13—13 in FIG. 12.
Figure 14:
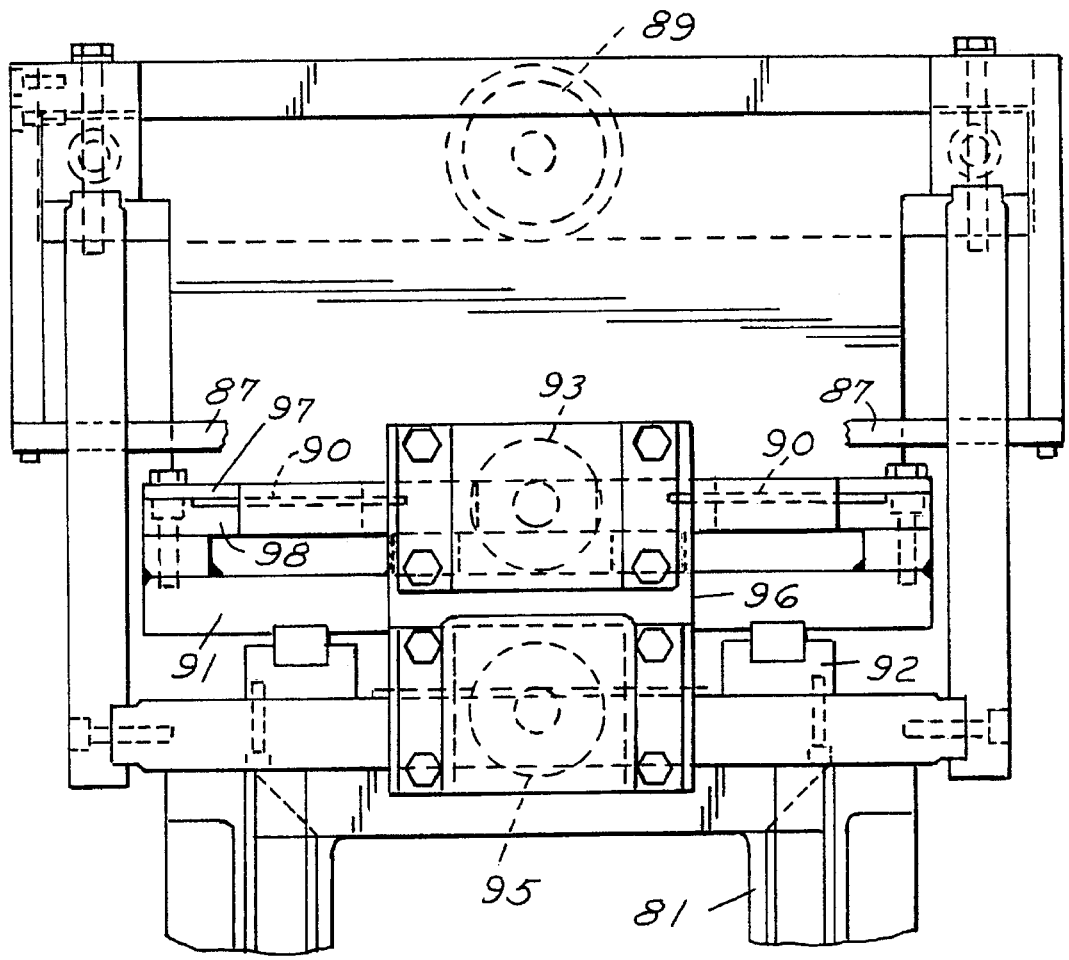
FIG. 14 is a fragmentary view taken along the line 14—14 in FIG. 11.
Figure 15:
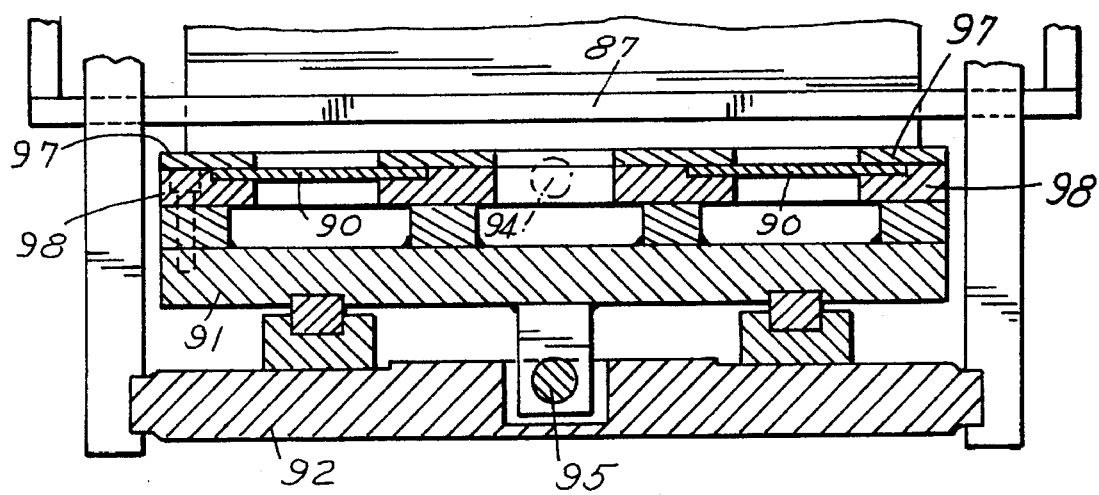
FIG. 15 is a sectional view taken along the line 15—15 in FIG. 13.
Figure 17:
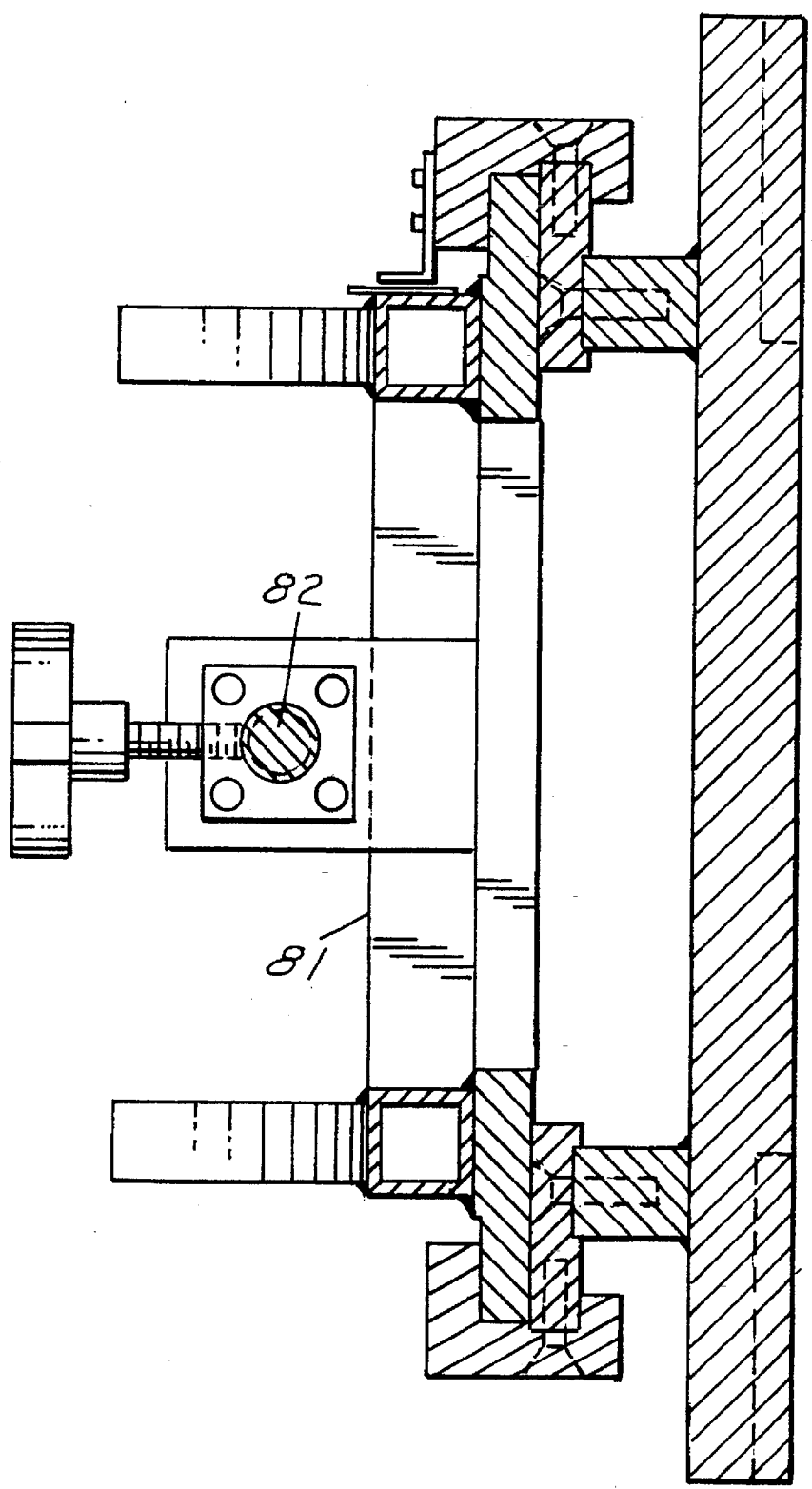
FIG. 17 is a sectional view taken along the line 17—17 in FIG. 11.
Figure 16:
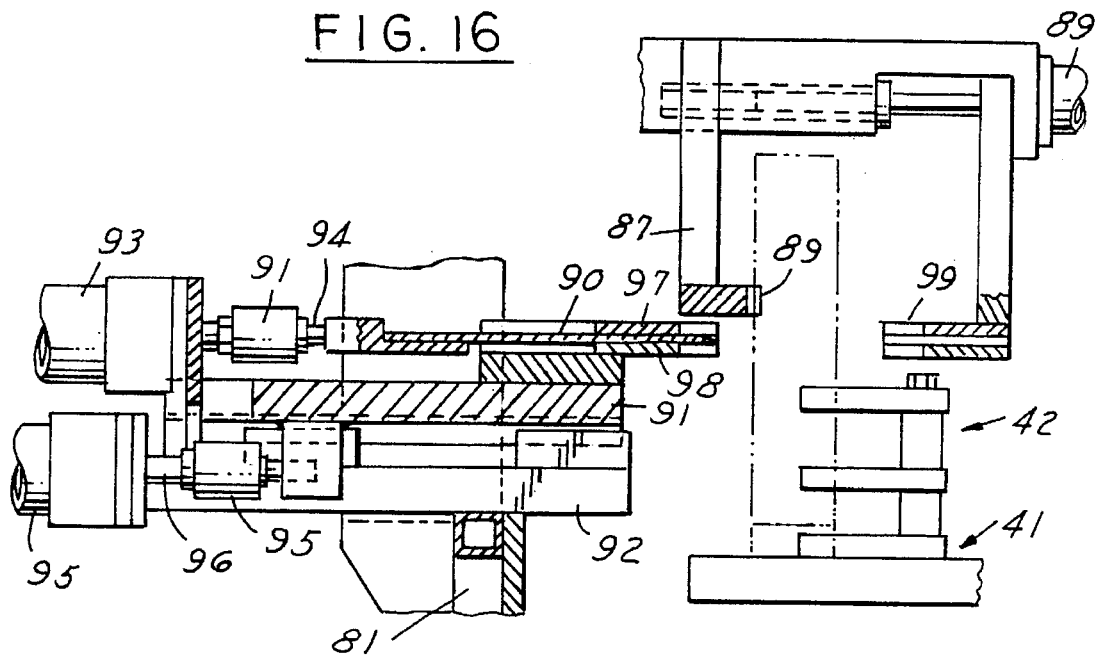
FIG. 16 is a part sectional view taken along the line 16—16 in FIG. 12.

Referring to FIGS. 10–16, the trimming apparatus 47 at the trimming station comprises a column 80 on base 40 which includes a slide 81 that is adjustable vertically through a threaded shaft 82 and knob 83 to raise and lower the trimming apparatus. The apparatus 47 further includes a first fixed holding member 85 having arcuate recesses 86 that receive and hold the bottles A with the caps C thereon in the recesses 43. A second holding member 87 having an arcuate edge 88 is positioned in fixed position above the knives 90 to engage the containers A above the area to be cut (FIGS. 10, 11, 16).

As shown in FIGS. 10–16, a pair of cutting knives 90 are mounted on a slide 91 for movement toward and away from the containers A. Each knife 90 has a V-shaped cutting edge such that the point of the knife 90 pierces the body of the container A. Slide 91 is guided for movement on a second slide 92. The slide 91 is moved by a cylinder 93 through a shaft 94. A second cylinder 95 is fixed on a bracket 96 mounted on cylinder 93 and has a shaft 97 connected to second slide 92. The first slide 91 has a projection 91a that extends into a recess 92a in the second slide 92 such that the slide supporting knives 90 have limited relative movement. The knives 90 are reciprocated in a horizontal space formed by fixed guides 97, 98 such that the knifes 90 move at a right angle relative to the vertical axis of containers A.

Third movable holding members 99 are provided above and below the knives 90 and has recesses 100 which cooperate with recesses 86 to hold the containers below the knives 90. The third holding members 99 are connected to a cylinder 89 to move toward and away from the containers A. The second holding member 87, being positioned above the knives, functions to prevent the containers from tilting toward the knives 90 during the cutting.

In operation, containers A are delivered to the intermittently driven turret at the bottle load station, then successively to the capping station, bottle inspection station, trimming station, reject station and unload station.

Although the apparatus has been described with respect to two containers, it can be readily modified to handling a single container and additional containers.

It can thus be seen that there has been provided a method and apparatus for applying the closure and for cutting the bottom from the container after the container has been subjected to one or more decorating operations. The method and apparatus provides for holding a closure which has threads stationary and rotating the container about its longitudinal axis to apply the closure on the container. Preferably the closure and container are in inverted position. The method of cutting provides for holding the container and closure in inverted positioned, gripping the container and moving a knife transversely of the longitudinal axis of the container to sever the bottom from the container. In addition, a method and apparatus are provided wherein the containers are handled in multiples; and wherein uniformity of application of the closures and cutting of the containers can be achieved at high speeds.

I claim:

1. In a method of forming a tube with a threaded closure from a container having a longitudinal axis formed with a threaded finish having an open end finish, a flexible side wall and a closed bottom which is thereafter cut to provide an open bottom, the improvement comprising bringing a container into position adjacent said closure, holding a closure having threads stationary prior to cutting the bottom, and rotating the container about its longitudinal axis to apply the closure on the container, thereafter cutting the bottom of the container from the remainder of the container along an axis transverse to the longitudinal axis of the container to provide a tube having an open bottom and a closure applied to its finish, said container being formed with recess means in the closed bottom wherein the step of rotating said container comprises engaging said recess means and rotating the container.

2. The method set forth in claim 1 wherein said step of engaging said recesses comprises moving a chuck having axially engageable element means axially into engagement with said recess means and said step of rotating said container comprises rotating said chuck.

3. The method set forth in claim 2 further including providing spring means yieldingly urging said chuck into engagement with said bottom of said container.

4. The method set forth in claim 3 wherein said step of holding the closure comprises providing a guide rail, providing a holding member having recesses, providing a closure adjacent said rail, and moving said holding member toward the rail to hold the closure in position.

5. The method set forth in claim 4 further including the step of yieldingly supporting said holding member.

6. The method set forth in claim 5 wherein the step of supporting said holding member comprises interconnecting said holding member with said chuck such that the holding member is moved into engagement with said closure before the chuck is rotated to rotate the container.

7. The method set forth in claim 6 wherein said step of interconnecting comprises supporting said chuck for movement toward and away from a container and moving the chuck toward and away from a container.

8. The method set forth in claim 7 wherein said step of moving said chuck and said holding member comprises providing an oscillating crank interconnected with said holding member and said chuck.

9. The method set forth in claim 8 further including providing a cam on said support of said chuck interconnecting said cam with said crank and providing a cam follower on said holding member movable with said holding member.

10. The method set forth in claim 9 further including the step of pivotally mounting said cam follower on said holding member.

11. The method set forth in claim 1 wherein said step of cutting the bottom of the container comprises holding the container and moving a knife transversely of the longitudinal axis of said container.

12. The method set forth in claim 11 further including the step of guiding the movement of the knife such that it is in a single plane.

13. The method set forth in claim 12 wherein said step of cutting said container comprises providing a flat knife having a V-shaped cutting edge, holding said container with the cap thereon in inverted upright position and guiding said knife blade transversely of the vertical axis of the container.

14. The method set forth in claim 13 wherein said step of holding the container in inverted upright position comprises providing opposed arcuate clamping members having opposed arcuate recesses and moving one of said clamping members toward the other toward the container to clamp the container.

15. The method set forth in claim 14 further including the step of providing a holding member spaced vertically from said holding member in a position above the path of movement of the knife to prevent tilting of the container.

16. The method set forth in claim 15 wherein the step of guiding the knife comprises providing a guide slot for guiding said knife.

17. The method set forth in claim 16 wherein said step of moving said knife comprises mounting said knife on a slide and moving said slide toward and away from the container.

18. The method set forth in claim 17 wherein said step of moving said first slide comprises providing a cylinder and actuating said cylinder to move said slide.

19. The method set forth in claim 18 further including providing a second slide, positioning said first slide on said second slide, providing a projection on said first slide, extending into a recess in said second slide to limit the movement of said slide upon actuation of said cylinder.

20. The method set forth in claim 19 further including the step of moving the knife vertically.

21. The method set forth in claim 12 wherein said step of holding said container comprises providing opposed gripping members for holding the container adjacent the closed end.

22. The method set forth in claim 21 wherein said step of guiding said knife comprises providing a guide surface on at least one of said gripping members.

23. The method set forth in claim 22 wherein said step of providing a guide surface comprises providing a slot in at least one of said gripping members.

24. The method set forth in claim 23 wherein said step of providing a slot in at least one of said gripping members further includes providing aligned slots in both of said gripping members.

25. The method set forth in any one of claims 1–24 further including the step of intermittently moving said closure through a predetermined path and performing the step of holding the closure and rotating the container to thread the closure on the container at one point along said path and performing the step of cutting the bottom of the container at another point along said path.

26. The method set forth in claim 25 wherein said steps of holding the closure and rotating the container to thread the closure on the container and cutting said container are performed while the closure and container are inverted.

27. The method set forth in claim 26 further including the step of providing indicia on the exterior of said side wall of said container prior to applying the closure to the container.

28. The method set forth in claim 12 wherein the step of guiding said knife comprises providing opposed guides having recesses for holding the container adjacent the closed bottom.

29. The method set forth in claim 28 including providing said guides with aligned guide surfaces and forming said knife with flat surfaces engaging said guide surfaces on said guides for guiding said knife in a single plane throughout its movement.

30. The method set forth in claim 29 including forming said knife with a V-shaped cutting edge.

31. The method set forth in claim 30 including providing said knife with a tapered surface on the side nearest the closed end of the container being severed.

32. The method set forth in claim 31 including providing secondary holding means between the knife and the closed end of the container to assist in preventing the container from tilting.

33. In forming a tube with a threaded closure from a container having a longitudinal axis formed with a threaded finish having an open end finish, a flexible side wall and a closed bottom which is thereafter cut to provide an open bottom, an apparatus comprising means for holding a closure having threads stationary, means for bringing said container into engagement with each closure, and means for rotating the container about its longitudinal axis to apply the closure on the container, further including means for cutting the bottom of the container from the remainder of the container along an axis transverse to the longitudinal axis of the container to provide a tube having an open bottom and a closure applied to its finish, said container being formed with recess means in the closed bottom wherein said means for rotating said container comprises means engaging said recess means and rotating the container.

34. The apparatus set forth in claim 33 wherein said means engaging said recesses comprises a rotatable chuck having axially engageable elements axially engaging said recesses and said means for rotating said container comprises said chuck.

35. The apparatus set forth in claim 34 including spring means yieldingly urging said chuck into engagement with said bottom of said container.

36. The apparatus set forth in claim 35 wherein said closure holding means comprises a guide rail, a holding member having recesses, and means for moving said holding member toward the rail to hold the closure in position.

37. The apparatus set forth in claim 36 including means yieldingly supporting said holding member.

38. The apparatus set forth in claim 37 wherein said means of supporting said holding member comprises interconnecting means between said holding member and said chuck engaging said container for rotating said container operable during movement of said chuck toward the container such that the holding member is moved into engagement with said closure before the chuck is rotated to rotate the container.

39. The apparatus set forth in claim 38 wherein said interconnecting means comprises means supporting said chuck for movement toward and away from a container and means moving the chuck toward and away from a container.

40. The apparatus set forth in claim 39 wherein said means for moving said chuck and said holding member comprises an oscillating crank and means interconnecting said crank with said holding member and said chuck.

41. The apparatus set forth in claim 40 including a cam on said supporting means for said chuck, means interconnecting said cam with said crank and a cam follower on said holding member movable with said holding member.

42. The apparatus set forth in claim 41 including means pivotally mounting said cam follower on said holding member.

43. The apparatus set forth in claim 33 wherein said means for cutting the bottom of the container comprises means for holding the container and a knife movable transversely of the longitudinal axis of said container.

44. The apparatus set forth in claim 43 including the means of guiding the movement of the knife such that it is in a single plane.

45. The apparatus set forth in claim 44 wherein said means for holding said container comprises opposed gripping members for holding the container adjacent the closed end.

46. The apparatus set forth in claim 45 wherein said means for guiding said knife comprises a guide surface on at least one of said gripping members.

47. The apparatus set forth in claim 46 wherein said guide surface comprises a slot in at least one of said gripping members.

48. The apparatus set forth in claim 46 wherein said guide surface comprises aligned slots in both of said gripping members.

49. The apparatus set forth in claim 44 wherein the means for guiding said knife comprises opposed guides having recesses for holding the container adjacent the closed bottom.

50. The apparatus set forth in claim 49 including guides with aligned guide surfaces and said knife having flat surfaces engaging said guide surfaces on said guides for guiding said knife in a single plane throughout its movement.

51. The apparatus set forth in claim 50 including means for forming said knife with a V-shaped cutting edge.

52. The apparatus set forth in claim 51 wherein said knife has a tapered surface on the side nearest the closed end of the container being severed.

53. The apparatus set forth in claim 52 including secondary holding means between the knife and the closed end of the container to assist in preventing the container from tilting.

54. The apparatus set forth in claim 30 wherein said cutting means for cutting said container comprises a flat knife having a V-shaped cutting edge, means holding said container with the cap thereon in inverted upright position and means guiding said knife blade transversely of the vertical axis of the container.

55. The apparatus set forth in claim 54 wherein said means holding the container in inverted upright position comprises opposed arcuate clamping members having opposed arcuate recesses and means moving one of said members toward the container to clamp the container.

56. The apparatus set forth in claim 55 including a holding member spaced vertically above said first holding member in a position above the path of movement of the knife to prevent tilting of the container.

57. The apparatus set forth in claim 56 wherein said means guiding the knife includes means defining a guide slot for guiding said knife.

58. The apparatus set forth in claim 57 including means for moving said knife comprising a slide on which said knife is mounted and means for moving said slide toward and away from the container.

59. The apparatus set forth in claim 58 wherein said means for moving said first slide comprises a cylinder and means for actuating said cylinder to move said slide.

60. The apparatus set forth in claim 59 including a second slide, means for positioning said first slide on said second slide, a projection on said first slide extending into a recess in said second slide to limit the movement of said slide upon actuation of said cylinder.

61. The apparatus set forth in claim 60 including means for moving the knife vertically.

62. The apparatus set forth in any one of claims 33–36 including means for intermittently moving said closure through a predetermined path past stations, said means for holding and rotating the container to thread the closure on the container being positioned at a station and said means for cutting the bottom of the container being positioned at a succeeding station.

63. The apparatus set forth in claim 62 wherein said means for applying the closure and means for cutting said container are constructed and arranged such that the closure and container are inverted.

* * * * *